United States Patent [19]

Ponci

[11] Patent Number: 5,036,879
[45] Date of Patent: Aug. 6, 1991

[54] PULSATION DAMPENER AND FLOW CHECK APPARATUS

[76] Inventor: Leon W. Ponci, 1030 Railroad Ave., Orland, Calif. 95963

[21] Appl. No.: 640,237

[22] Filed: Jan. 11, 1991

[51] Int. Cl.⁵ ............................................ F16K 17/06
[52] U.S. Cl. .................... 137/496; 137/853; 138/30; 251/5; 417/540
[58] Field of Search ............... 137/496, 853; 251/5; 417/540; 138/30

[56] References Cited

U.S. PATENT DOCUMENTS

| | | | |
|---|---|---|---|
| 2,448,118 | 8/1948 | Pellettere | 417/540 X |
| 3,534,768 | 10/1970 | Powell | 137/496 |
| 3,741,692 | 6/1973 | Rupp | |
| 3,836,113 | 9/1974 | Johnson | 251/5 |
| 4,195,668 | 4/1980 | Lewis | |

Primary Examiner—Robert G. Nilson

[57] ABSTRACT

A valve structured for attachment in-line with a conduit containing a fluid under pressure. The valve provides a flow path for the fluid, with the flow path including an area whereat all of the fluid passing through the valve must pass between a stationary surface and an interior surface of an elastic tubular member. A liquid filled chamber of the valve is isolated from the flow path, and in communication with an exterior surface of the elastic tubular member. A first pipe is attached to the valve in open communication with the liquid filled chamber. The other end of the first pipe is connected to a pressure vessel. A flexible diaphragm is affixed within the pressure vessel to divide the interior cavity thereof into a first and a second chamber. Both the first chamber and first pipe are completely filled with liquid and in communication with each other. A second pipe is connected in open communication with the second chamber of the pressure vessel, with the other end of the second pipe connected to the valve in open communication with a downstream side of the fluid flow path through the valve. A compression spring is positioned within the second chamber, and pressing against the flexible diaphragm. A manually operable adjustment is provided to select the amount of pressure the compression spring applies to the flexible diaphgram.

6 Claims, 8 Drawing Sheets

PULSATION DAMPENER AND FLOW CHECK APPARATUS

BACKGROUND OF THE INVENTION

1. Field of the Invention

This invention is an apparatus which attaches in-line with a pipe containing a fluid, namely a pipe with a gaseous material flowing therethrough under pressure. The invention is specifically structured to serve as a flow direction check valve, and further as an improved pulsation dampener to reduce pulsations in piping leading from a natural gas well in order to allow for increased accuracy in measuring the volume of fluid passing through the pipe.

2. Description of the Prior Art

A variety of check valves and surge or pulsation dampeners for use in pressured gas or liquid lines have been developed in the past. None of the prior art devices of which I am aware, possess all of the advantages which my invention provides. Some past art devices appear to be very complicated as evidenced by having a large number of parts which would add to the initial cost of manufacturing, to the long term maintenance costs, and to the skill required by a worker to install and service the devices. Furthermore, past art devices, particularly surge or pulsation dampeners, have been found to be only marginally effective at reducing pulsations in the fluid and pipe. Pulsations in the pressure of a fluid within a pipe, whether the fluid is a gas, liquid, or a combination thereof, are generally caused by the actions of equipment in communication with the fluid and pipe. In most cases the equipment causing the pulsations is a fluid pump located downstream, with the pump being responsible for pushing the fluid into the pipe under pressure.

One reason pressure pulsations are undesirable is that rapid pressure changes and the resultant hammering therefrom, adversely effect fluid measuring and recording meters connected in-line with the pipe for the purpose of determining the precise volume of fluid passing through the pipe. Most measuring and recording meters are connected in-line with the pipe, downstream from the pressuring pump, with the entire volume of fluid in the pipe flowing through the meter. If rapid and relatively high pressure changes are occurring in the pipe, the measuring meter will be vibrated or hammered, and the accuracy of the meter in determining the exact volume passing therethrough will diminish somewhat relative to the extent of the pulsations. When the accuracy of a measuring meter is diminished, the buyer or seller of the fluid may be financially shorted. A measuring meter having an inaccuracy of even a small percentage can dramatically effect what a seller receives in terms of dollars for his product, depending on the volume pushed through the meter and the price of the fluid.

Additionally, some past art surge or pulsation dampeners I have seen in use in the field, operate utilizing the metal mercury, which is not only quite expensive, but poses a potential health hazard to humans and the environment.

Currently there exists a need in the market place for safe, simple and relatively inexpensive pulsation dampeners which have improved abilities in reducing pulsations in pressured fluid directing pipes.

BRIEF SUMMARY OF THE INVENTION

My invention is a apparatus attachable in-line with a pipe serving as a conduit through which fluid such as natural gas is being transported under pressure. Although the invention is primarily for use with gaseous fluid materials, the device will also function with liquids such as water, gasoline, oil, and the like, or combinations of liquid and gaseous materials. My invention is structured to function as a check valve thereby ensuring unidirectional flow through the pipe, and further operates as a highly effective pulsation dampener to greatly reduce pulsations in the fluid traveling through the pipe. The use of my invention allows for a significant improvement in the accuracy of commonly used measuring and recording meters.

Additionally, my invention is simply structured, being relatively few in parts, relatively inexpensive to manufacture and repair, and does not utilize mercury.

In view of the above, it can be appreciated that a primary object of my invention is to reduce pulsations in a fluid flowing through a pipe, with a further object of my invention being to reduce pulsations in order to allow increased accuracy in measuring and recording the volume of fluid passing through the pipe.

Additionally, a further object of my invention is to provide the above in an apparatus which also serves as an effective check valve to ensure uni-directional fluid flow in the pipe.

Another object of my invention is to provide the above in an apparatus which is relatively inexpensive to manufacture, being few in parts to allow for low cost manufacturing, maintenance, ease of repair, and increased durability.

A still further object of my invention is to provide the above in an apparatus which is relatively safe for workers to set-up and service, and relatively environmentally safe.

Other objects and advantages of my invention will be recognized with a continued reading and an examination of my attached drawings where a preferred embodiment of my invention is described and illustrated for example.

DESCRIPTION OF A PREFERRED EMBODIMENT

Figure 1:
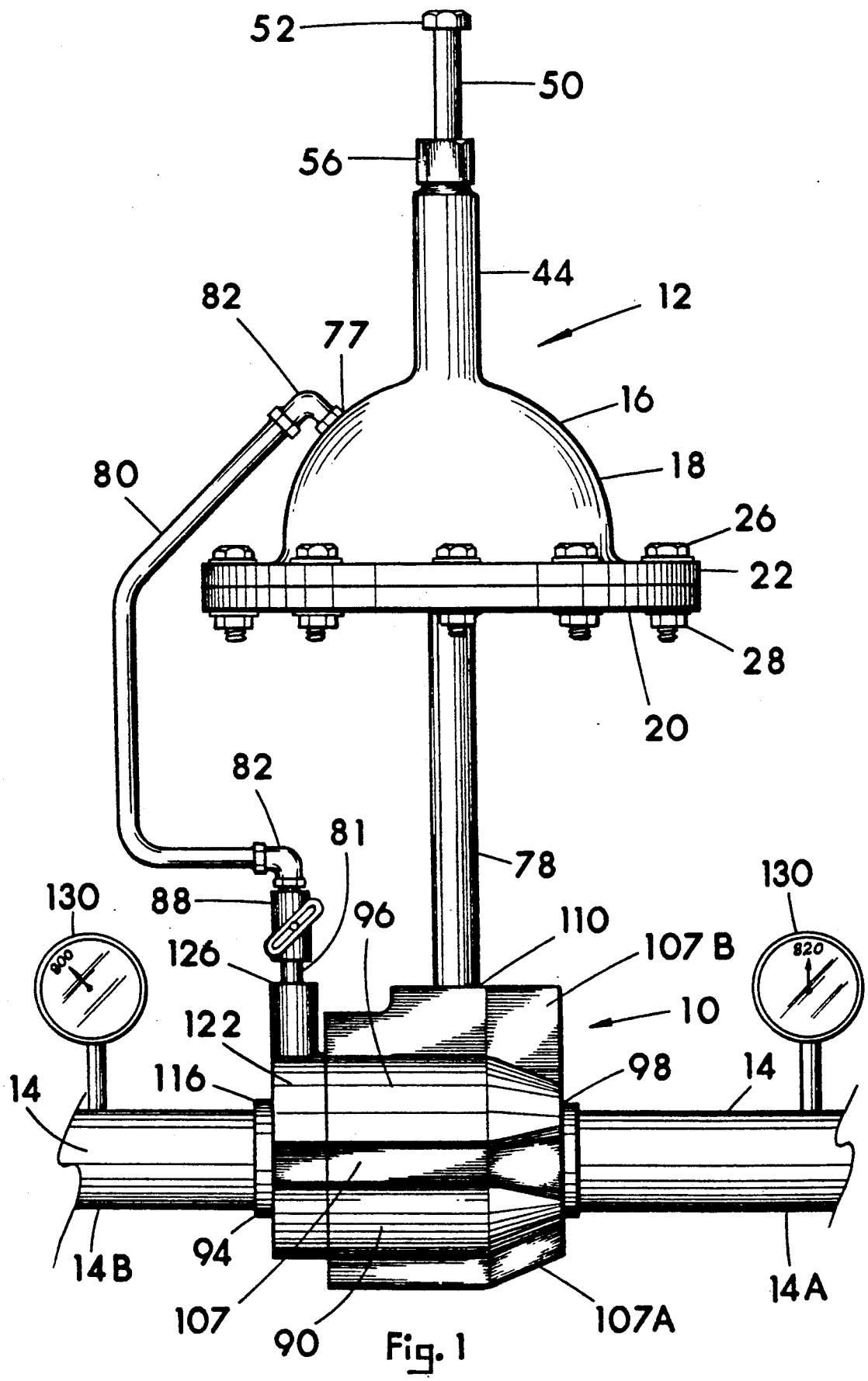
FIG. 1 illustrates a preferred embodiment of my invention connected in-line with a pipe.

Referring now to the drawing figures in general where a preferred embodiment of the invention is illustrated, with FIG. 1 being an example of the invention shown connected in-line with a conduit or pipe 14. The invention is primarily comprised of two main sections designated generally as valve 10 shown connected directly in-line with pipe 14, and pulsation dampener 12 shown connected to and above valve 10 by two small conduits or pipes 78 and 80. Valve 10 and pulsation dampener 12 work conjunctionally to both effectively check the direction of fluid flowing through pipe 14, and to eliminate or greatly reduce pulsations of fluid 84 flowing through pipe 14.

Pipe 14 in this example is a hollow conduit containing a gaseous material, specifically natural gas under pressure, however, as stated earlier, the fluid within pipe 14 could be any flowable material such as a gas, a liquid or a combination of gas and liquid, and will henceforth be referred to as fluid 84. Fluid 84 in this example would be moving from right to left through pipe 14 in FIG. 1 and 7. As may be ascertained from FIG. 8, pipe 14 A is the upstream side of pipe 14, that is, upstream of valve 10, which normally would be extending from the pressuring pump at the gas well, with gas well and pump 31 normally being within three or four meters of where valve 10 would be installed in pipe 14. Pipe 14 B would be the downstream side of pipe 14, that is, downstream of valve 10, and normally would be under pressure from other sources, in this case additional gas wells and pumps 31 connected into the main line 15, with the main line 15 being in open communication with pipe 14 B so pipe 14 B may push already metered and recorded fluid 84 into the main line 15. All of the fluid 84 flowing through pipe 14 passes through valve 10 from the upstream side to the downstream side thereof, and valve 10 ensures unidirectional flow as will be explained later. Pipe 14 B typically operates at a lower operating pressure than pipe 14 A, resulting in a pressure differential between pipe 14 B and 14 A, or between the two oppositely disposed ends of valve 10. As shown in FIG. 8, a measuring and recording meter 13 would be further downstream in pipe 14 B from valve 10, or in other words, valve 10 and pulsation dampener 12 should be installed between the pressuring pump and well 31 feeding pipe 14 A and the measuring and recording meter 13 in order to remove pulsations in the system prior to fluid 84 entering meter 13 to be measured and recorded. As shown in FIG. 1, 6, 7, and 8, two pressures gages 130 should be installed in pipe 14, one gage 130 in pipe 14 A, and one gage 130 in pipe 14 B each directly adjacent an end of valve 10. Although not shown in the drawings, normally, shut-off or isolation valves are recommended on each side of fittings such as valve 10 or meter 13 for convenience.

Figure 2:
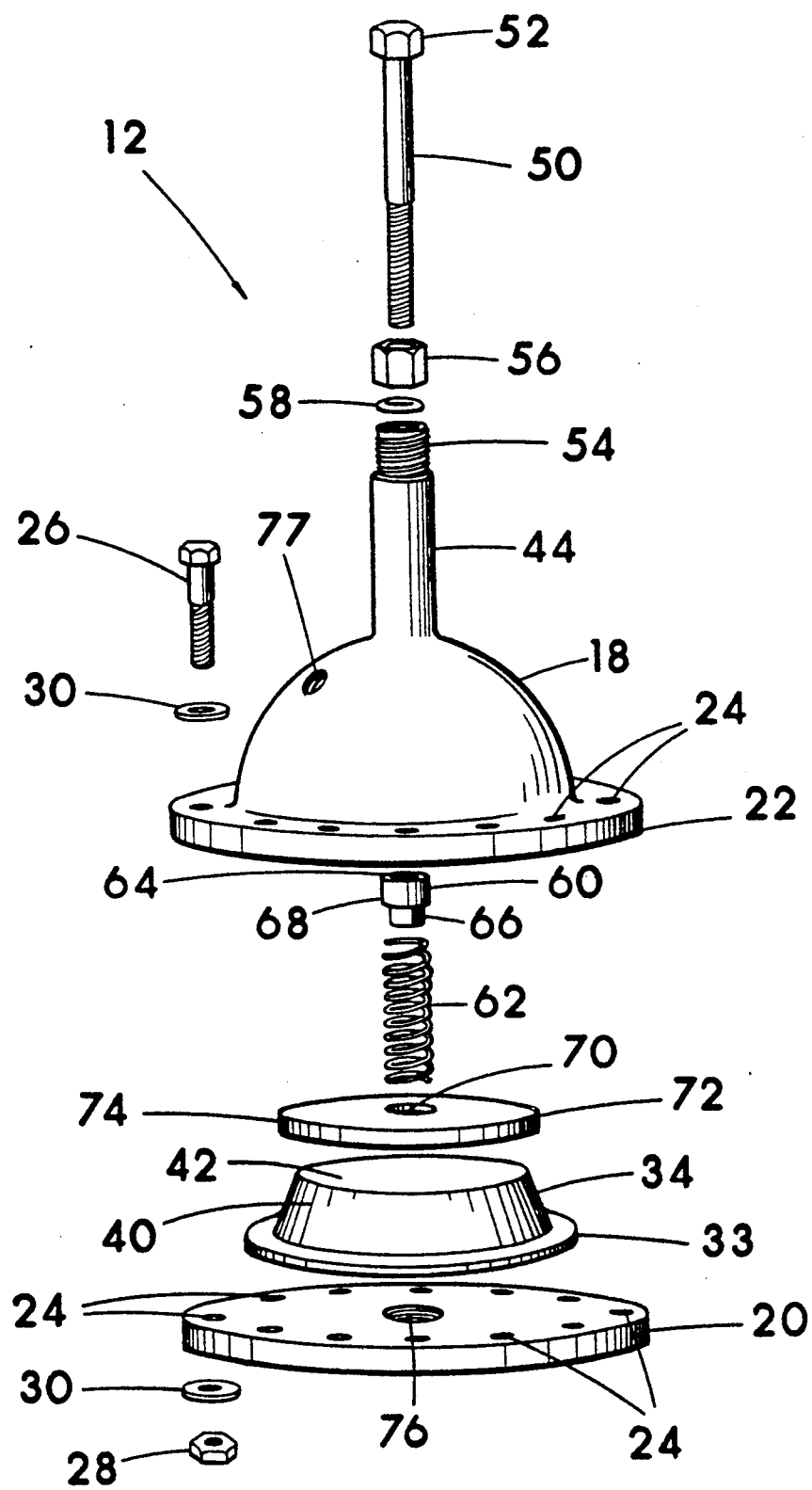
FIG. 2 illustrates the upper portion of the embodiment of my invention shown in FIG. 1 in an exploded view.
Figure 3:
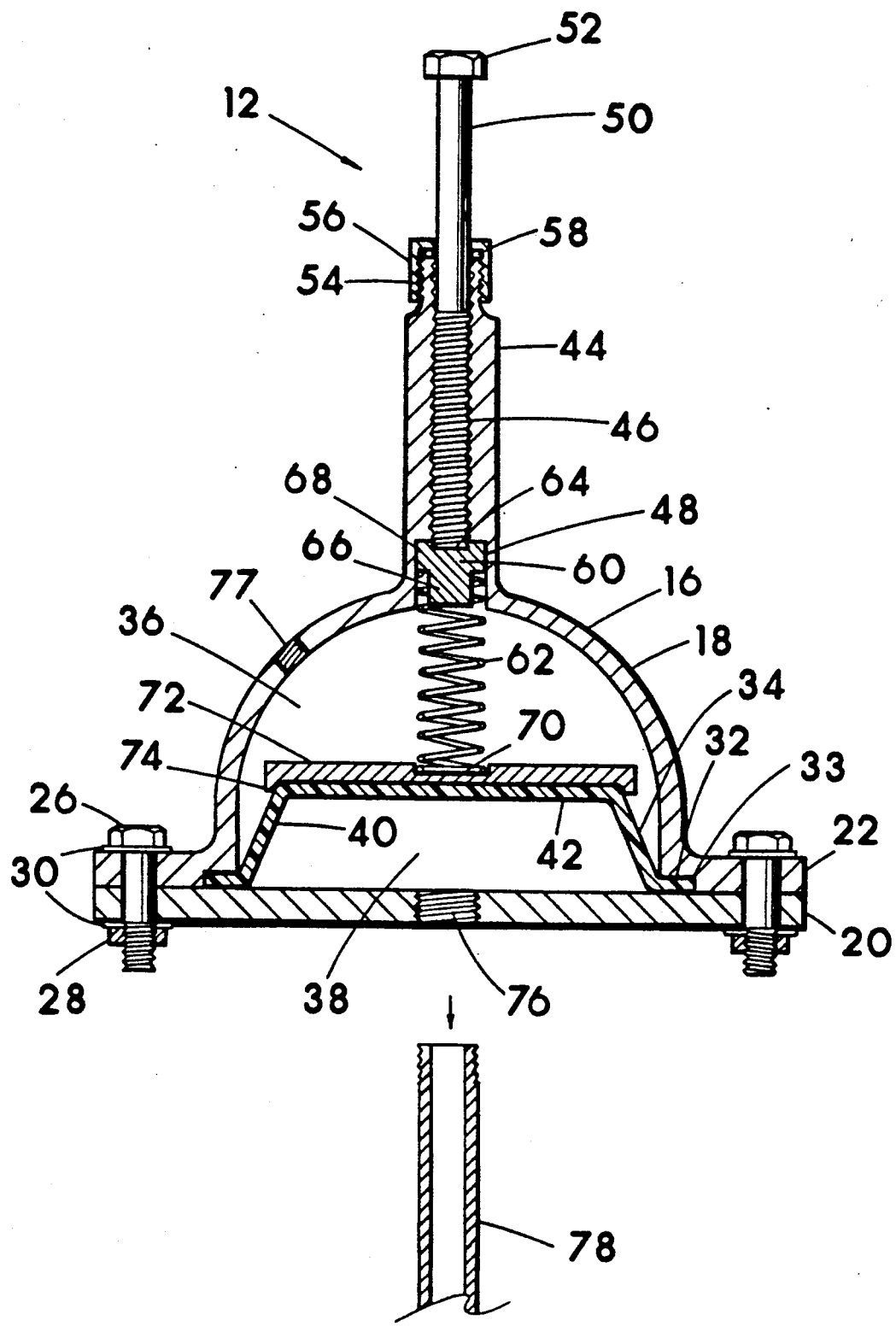
FIG. 3 primarily illustrates the components shown in FIG. 2 assembled in a cross-sectional view.

Referring now to FIG. 2 where the primary components of pulsation dampener 12 of the invention are illustrated in an exploded view, and to FIG. 3 where the components shown in FIG. 2 are shown assembled in partial cross section. Pulsation dampener 12 is comprised of a pressure vessel or housing 16 comprised of two separable bolt together sections, housing section 18 and housing section 20. Housing 16 being a pressure vessel, must be manufactured of sufficiently strong materials to withstand the desired operating pressures. With natural gas being pumped from a well 31, often pressures exceed 800 P.S.I. Steel, cast iron, stainless steel, or aluminum are some materials from which housing 16 may be manufactured. Housing section 18 is shown as a hollow dome having an annular flange 22 at the lower edge thereof. The dome shape of housing section 18 is preferred for strength and ease of manufacturing, but is not essential.

Flange 22 has a plurality of evenly spaced bolt apertures 24 therethrough and positioned to allow for bolting housing sections 18 and 20 together. Housing section 20 is a rigid circular plate of about the same outer diameter as flange 22 of housing section 18, and preferably manufactured of the same material as housing section 18. Housing section 20 also has a plurality of evenly spaced bolt apertures 24 which may be aligned with the bolt apertures 24 of flange 22 for bolting the two housing sections 18 and 20 together with bolts 26, nuts 28, and washers 30. As shown in FIG. 3 at the bottom interior edge of the dome of housing section 18, adjacent flange 22 is an annular notch or recess 32 sized to receive an annular flange 33 of a diaphragm 34.

Diaphragm 34 is used to divide the space or cavity in the interior of housing 16 into an upper and lower chamber, designated chamber 36 and chamber 38. Diaphragm 34 is made of flexible and resilient materials which will not break-down upon contact with whatever gases or fluids which it may contact during use. The elastic or rubbery material of diaphragm 34 is impervious to the passage of liquids or gases. Diaphragm 34 as shown in FIG. 2 is shaped like a pie pan, being circular and having an upwardly angled annular sidewall 40 connectively extending between flange 33 and a flat top surface 42 of the diaphragm 34. Recess 32 of housing section 18 is sized generally commensurate with the diameter of flange 33 to allow fitting of flange 33 into recess 32 prior to the bolting together of housing sections 18 and 20. Recess 32 is sized relative to flange 33 so as to form a leak proof pressure seal separating chambers 36 and 38 from one another, with the seal relying in part on compression of flange 33 with the bolting together of housing sections 18 and 20. The compression of flange 33 retains diaphragm 34 in place, and also seals the seam between the bolted together housing sections 18 and 20 against leaks escaping housing 16 as may be ascertained from FIG. 3.

Essentially, diaphragm 34 divides housing 16 into two separate chambers 36 and 38, with diaphragm 34 being the divider which is positioned within housing 16 and in communication with chambers 36 and 38 so as to allow the flexible divider to be able to flex upward into chamber 36, and downward into chamber 38 during operation of the invention. In view of this, one can see that other shapes such as a flat diaphragm may be used instead of the specifically described and shown diaphragm 34. In using a flat diaphragm, space would need to be provided above and below the diaphragm to allow the necessary movement as will be appreciated with a continued reading.

On the center top section of housing section 18 is a tubular section designated neck 44 extending from the exterior surface of the dome. Neck 44 is positioned centrally on housing section 18, generally positioned straight above or aiming at the center of housing section 20. Neck 44 is hollow, having a central bore extending from the upper open end downward into chamber 36. A first interior threaded section of the bore of neck 44 is designated threaded bore 46, which is the upper section of neck 44, and a second section, being the lower section of the bore is an unthreaded section adjacent chamber 36, designated bore section 48. Bore section 48 is shown larger in diameter than threaded bore section 46. Fitted within threaded bore section 46 is a bolt 50. Bolt 50 has threads on the lower shank end sized to engage with the threads of threaded bore section 46. The upper shank section of bolt 50 is unthreaded, being smooth, and comprising about 50 percent of the length of bolt 50. The terminal end of bolt 50 adjacent the unthreaded shank section has a hex head 52 to allow grasping with a handled tool such as an adjustable wrench to manually rotate the bolt 50.

The upper or distal end of neck 44 has exterior threads 54 thereon as shown in FIG. 2 and 3. Threads 54 mate with the internal threads of a removable compression nut 56. Positioned underneath nut 56, resting on top of the flat top end of neck 44 is a flexible O-ring 58 made of rubbery material, which provides a pressure seal. Greater understanding will be gained with the reading of a description of one proper order of assembly of the components of neck 44. Set O-ring 58 on the flat top of neck 44 surrounding the bore in the neck, followed by threadably engaging nut 56 with neck threads 54, without tightening nut 56, followed by inserting the threaded shank end of bolt 50 through both nut 56 and O-ring 58 and engaging the threads of bolt 50 with the threads of threaded bore 46. Bolt 50 should be turned clockwise until the lower threaded end thereof enters bore section 48. Nut 56 may then be tightened. Tightening of nut 56 onto threads 54 compresses O-ring 58 against the smooth shank section of bolt 50 and against the flat top end of neck 44 to form a pressure seal to prevent leakage or the escape of pressure from within chamber 36 around bolt 50. It should be noted that it is desirable to be able to adjust the position of bolt 50 within neck 44 during use of the invention. In order to do so, one can simply put a wrench on hex head 52 and rotate bolt 50, however, it would be advisable to back nut 56 off a little prior to rotating bolt 50 in order to prevent tearing of O-ring 58. After adjustment of bolt 50, nut 56 should then be retightened to ensure a proper pressure seal. The relative sizing of the interior of nut 56, the size of O-ring 58, and the size of the smooth shank area of bolt 50 must be proper for adequate sealing, and I anticipate those skilled in the art will have no problem with this arrangement.

The bottom terminal end of bolt 50, that portion thereof having threads, extends into bore section 48. Bore section 48 is a smooth walled bore larger in diameter than threaded bore section 46 of neck 44. The lower end of bore section 48 is in communication with chamber 36 as may be ascertained from FIG. 3. Slidably fitted within bore section 48 is an annular rigid metal member designated spring holder 60. Spring holder 60 has two outer diameters, designated smaller diameter 66 and larger diameter 68. Larger diameter 68 is sized just slightly smaller in diameter than the internal diameter of bore section 48 to allow sliding of the spring holder 60 within bore 48. The second or smaller diameter 66 of spring holder 60 is closest to chamber 36. The smaller diameter 66 is sized to fit inside the open top interior of a coiled compression spring 62, with the top of compression spring 62 fitted within bore section 48 and abutted against the bottom of larger diameter 68 of spring holder 60.

In the center upper end of spring holder 60, in the flat top of larger diameter 68, is a shallow annular bore or recess 64 sized slightly larger than the terminal threaded end of bolt 50. The threaded terminal end of bolt 50 rests within recess 64. By moving bolt 50 towards or away from chamber 36, spring holder 60 may be moved towards or away from chamber 36. Bolt 50 pushes spring holder 60 toward chamber 36, and spring 62 pushes against spring holder 60 causing the holder 60 to follow bolt 50 upward when bolt 50 is being retracted away from chamber 36. Bolt 50 and spring holder 60 essentially serve the purpose of applying pressure to compression spring 62, with the applied pressure being selectable as desired as will be further appreciated with a continued reading. It should be noted it is advisable to flatten the last couple of threads on the terminal end of bolt 50 once fully inserted into bore section 48 to prevent the inadvertent removal of the bolt 50 from neck 44, which if the removal occurs with high pressure in chamber 36, bolt 50 may be shot out of neck 44 at a high and dangerous rate of speed.

As may be ascertained from FIG. 2 and 3, the lower end of compression spring 62 resides within a circular stabilizing recess 70 positioned in the top center of a rigid pressure distributing plate 72. Spring holder 60 and compression spring 62 should be installed in housing 16 prior to installing plate 72. Plate 72 should be installed before installing diaphragm 34. Plate 72 is an annular rigid disk having an annular flange or lip 74 depending downward from the bottom side thereof. Plate 72 and lip 74 may be made plastic, metal, or any other suitable material. The center space of plate 72 between lip 74 is approximately the diameter of top surface 42 of diaphragm 34, rendering a space in which top surface 42 may reside. Lip 74 depending downward partly over annular sidewall 40 in combination with the support of top surface 42 of diaphragm 34 lends stability to plate 72 in the in-use position, with further stability of plate 72 rendered by abutment pressure applied by compression spring 62 as shown in FIG. 3. In use, compression spring 62 is constantly under at least slight compression by way of spring holder 60 pushing downward on spring 62, with the degree of downward pressure being determined by the position of bolt 50. The primary purpose of plate 72 is to distribute pressure from compression spring 62 evenly onto top surface 42 of diaphragm 34. During the initial installation and set-up of the invention, compression spring 62 should be set to apply little or no pressure against plate 72 and diaphragm 34 as will be appreciated with continued reading.

Through the center of housing section 20, entering into communication with chamber 38 is an aperture 76 having threads therein to allow attachment of one end of threaded pipe 78. Through the domed housing section 18, entering into communication with chamber 36 is an aperture 77 having threads therein to allow attachment of one end of pipe 80. A pipe union or a slip or compression pipe fitting 82 is suggested for the connection of pipe 80 to aperture 77 since pipe 80 is threaded into two spaced apart apertures, one aperture at each end of the pipe, as will be understood with further reading and an examination of the drawings.

The purpose and operation of the above described major components of pulsation dampener 12 will be further detailed following the description of valve 10 with which pulsation dampener 12 functions conjunctionally.

Figure 4:
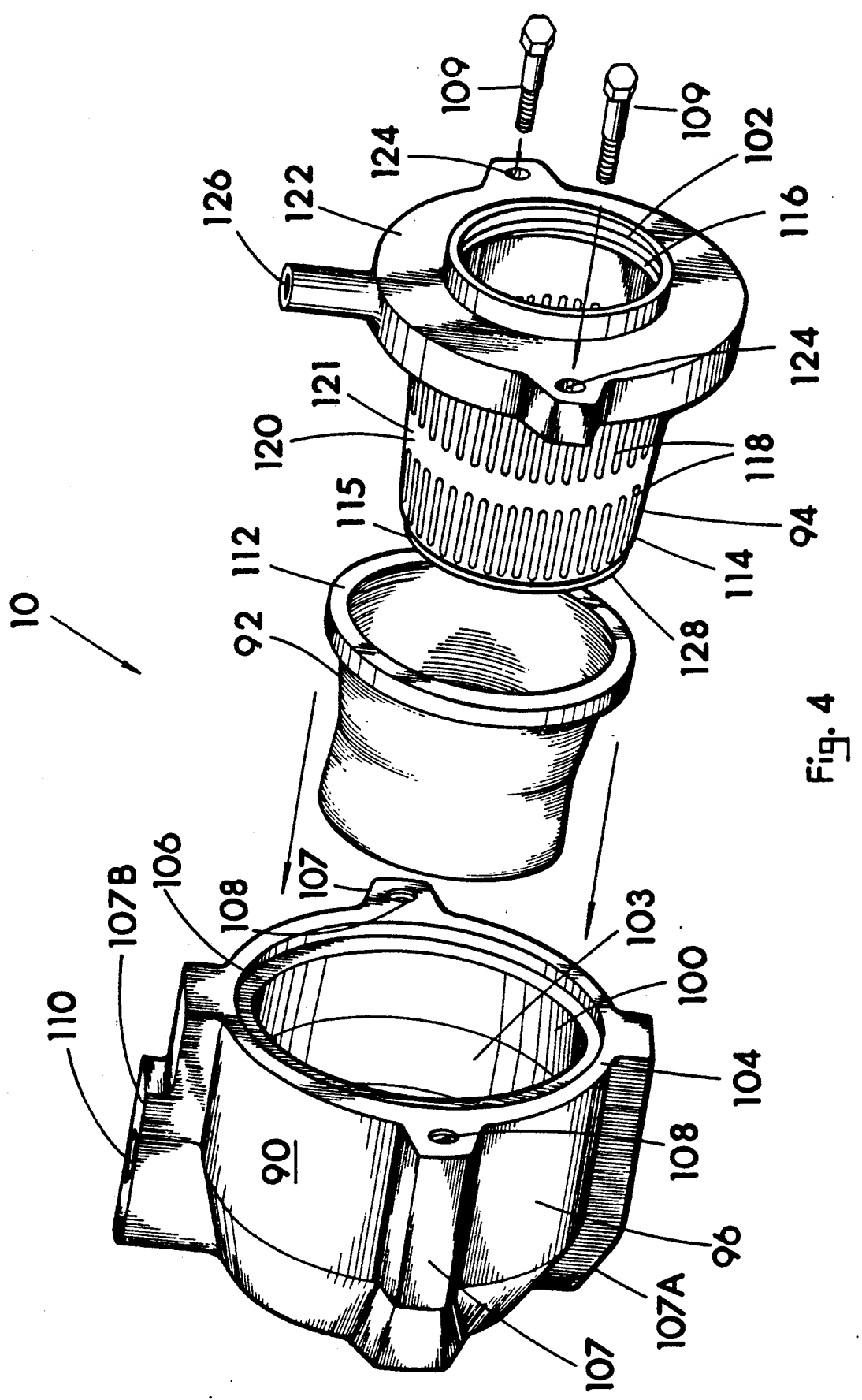
FIG. 4 illustrates the lower portion of the embodiment of my invention shown in FIG. 1 in an exploded view.

Referring now mainly to FIG. 1, 4, 6, and 7 for the description of a preferred embodiment of valve 10. Valve 10 as shown in FIG. 4 is comprised of three separable major components; housing 90, flexible tube 92, and a tubular grate member 94 with attached face plate 122. Housing 90 is a tubular member formed primarily of an annular sidewall 96 open at two oppositely disposed ends, designated first end 98 and second end 100. First end 98 has internal threads 102 therein to allow the connecting of one threaded end of pipe 14. Second end 100 has a flat, annular abutment surface 104, and an adjacent interior annular recessed area, designated recess 106, both features are shown in best FIG. 4. Annular sidewall 96 defines an interior cavity 103 which has a larger diameter in the center thereof, with the diameter gradually reducing in both directions from the center toward the open ends 98 and 100 of housing 90. The shape of cavity 103 is one which provides space to allow outward flexing of the central region of flexible tube 92 as will be better understood with a continued reading.

Affixed on two oppositely disposed exterior sides of annular sidewall 96 are two elongated protrusions 107 each having a centrally positioned threaded bore therein, each designated bore 108. Bores 108 are for receiving bolts 109 to explained later. It should be noted there are four protrusions on the exterior of tubular housing 90, which are for various purposes such as simply for added strength to annular sidewall 96 as is the case of the lower protrusion 107 A, while the side protrusions 107 provide additional strength and material to form bores 108, and the upper protrusion 107 B provides additional strength and material for defining port 110.

Port 110 extends through upper protrusion 107 B and annular sidewall 96 to open into communication with the open interior of housing 90. The outer end of port 110 is internally threaded to allow for attachment of the bottom end of pipe 78 as shown in FIG. 6 and 7.

Figure 6:
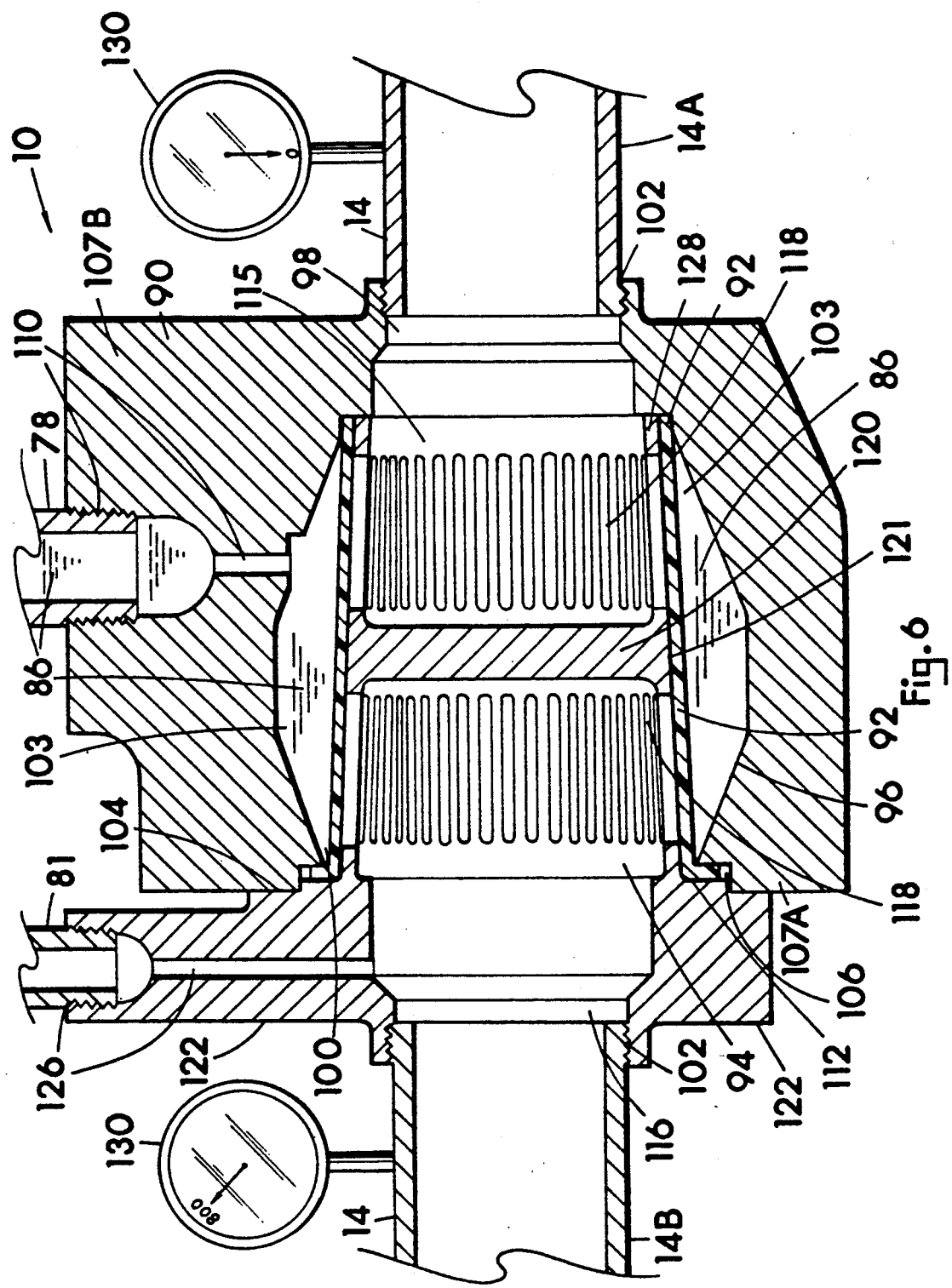
FIG. 6 illustrates the lower portion of the embodiment of my invention shown in FIG. 1 and 4 in an assembled cross-sectional view to depict internal operational activities.
Figure 7:
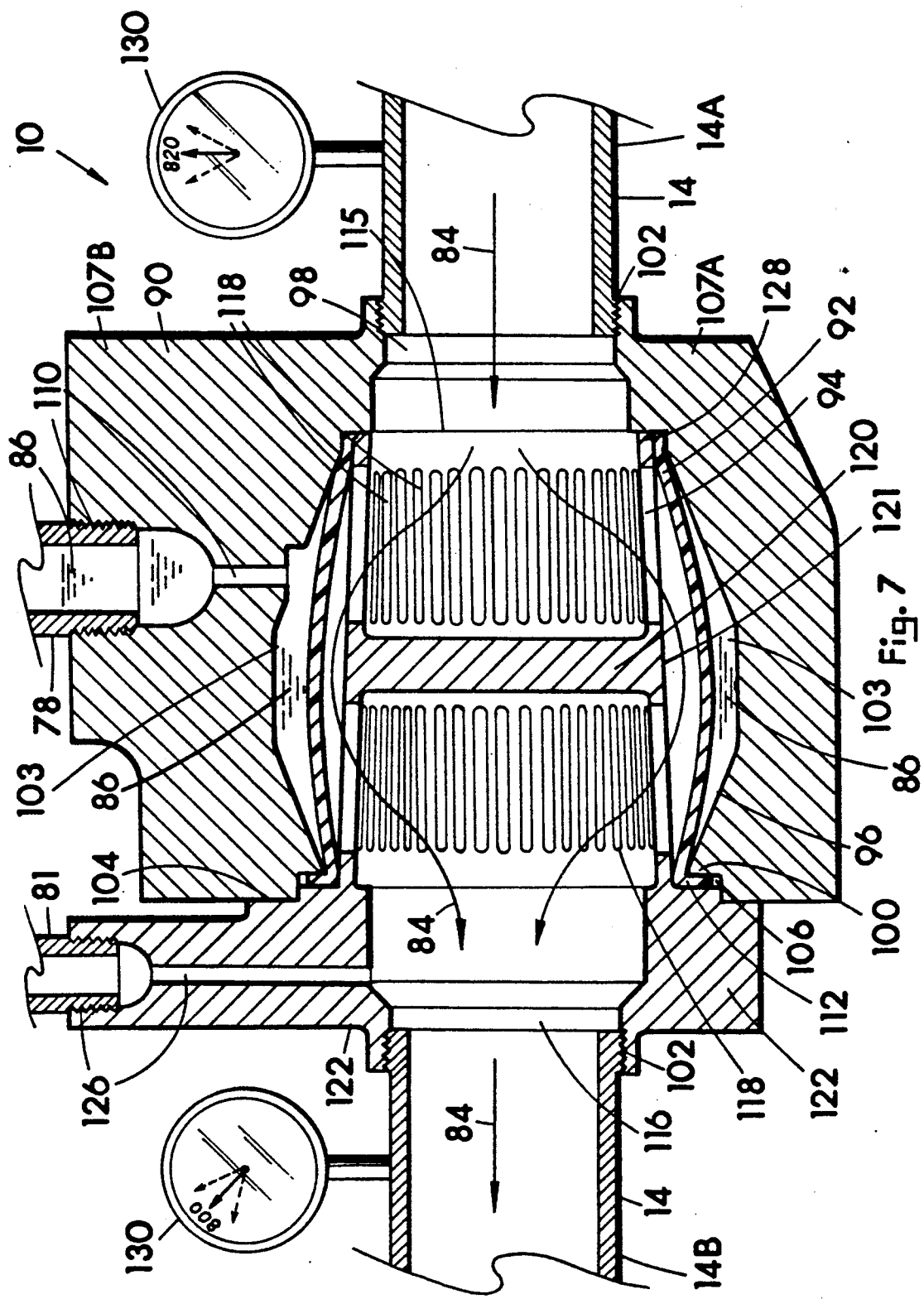
FIG. 7 illustrates the lower portion of the embodiment of my invention shown in FIG. 1 and FIG. 4 in an assembled cross-sectional view to depict internal operational activities with fluid flowing.
Figure 8:
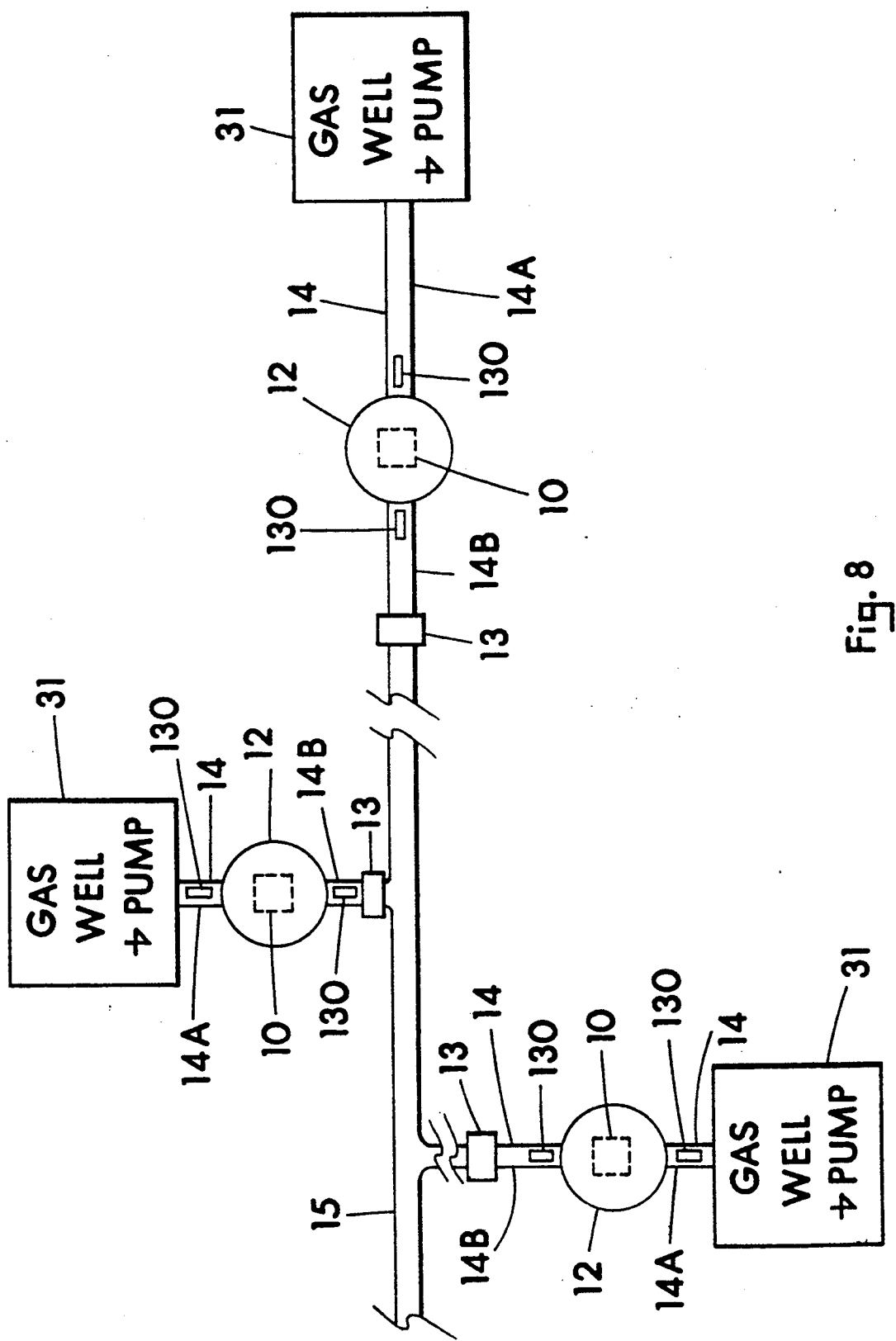
FIG. 8 illustrates in a top plan view a typical natural gas field where multiple wells and pumps are feeding into a main line. The invention is shown in the piping adjacent each gas well.

In FIG. 4, flexible tube 92 is shown removed from housing 90, and in the cross sectional views of FIG. 6 and 7, tube 92 is shown installed within cavity 103 of housing 90. Flexible tube 92 is made of a material which is flexible and elastic. The rubbery material of flexible tube 92 is impervious to the passage of liquids or gases. One end of flexible tube 92 has an outwardly extending annular flange 112. As shown in FIG. 6 and 7, tube 92 inserts into cavity 103 of housing 90 with the non-flanged end of the tube positioned toward first end 98 of housing 90, and with the oppositely disposed end of tube 92 positioned toward second end 100 with flange 112 residing within annular recess 106. The internal open diameter of flexible tube 92 with the tube in a normal or relaxed state is of about the same diameter as the external diameter tubular grate 94.

In FIG. 4, tubular grate member 94 with attached face plate 122 is shown removed from housing 90 and flexible tube 92, and in the cross sectional views of FIG. 6 and 7, tubular grate member 94 is shown installed within the interior of flexible tube 92, which in turn is installed within cavity 103 of housing 90. Tubular grate member 94 and the attached face plate 122 is preferably manufactured of rigid corrosion resistant metal. Tubular grate member 94 is comprised of a tubular section structured of an annular elongated wall 114 having a plurality of elongated openings 118 therethrough. Tubular grate member 94 has two oppositely disposed opens ends, designated end 115 and 116 in the drawings.

The material defining or encircling open end 116 also has threads 102 as shown best in FIG. 4 to allow the threaded attachment of pipe 14, and more specifically pipe 14 B. Adjacent open end 115 on the exterior surface of annular wall 114 of tubular grate member 94, is a short band or area extending completely around the end of tubular grate 94 which is absent apertures 118, designated area 128. Area 128 provides a sealing surface as will be explained later.

A solid wall or partition 120 spans across approximately center of annular wall 114 to divide the tubular grate member 94 into two sections, with one section being in communication with open end 116, and the other section being in communication with open end 115. A band of smooth material which correlates with the position of partition 120 exists on the exterior surface of annular wall 114. The smooth band of material is designated band 121, and provides a sealing surface as will be explained later. Openings 118 are located on each side of solid partition 120 and band 121 as shown in FIG. 4.

Attached to tubular grate member 94 adjacent end 116 thereof is face plate 122. Tubular grate member 94 and face plate 116 may be cast or otherwise formed of a single piece of metal, or formed of two separable pieces. Face plate 122 has two oppositely disposed unthreaded bolt apertures 124 which are alignable with threaded bores 108 to allow the removable attachment of face plate 122 to tubular housing 90 with bolts 109. As may be ascertained with FIG. 4, 6 and 7, face plate 122 has a port 126 extending from the open interior of tubular grate member 94 upward through the top edge of the plate 122. The upper interior end of port 126 has threads to allow attachment of a short pipe nipple 81, which in turn is connected to a manually operable shut-off valve 88 shown in FIG. 1. Valve 88 is connected in-line with pipe 80 with a compression fitting 82 or any other suitable pipe attachment method.

As shown in FIG. 6 and 7, with face plate 122 bolted in place to second end 100, abutting surface 104 of housing 90, and flexible tube 92 in place over tubular grate 94 within cavity 103, a pressure seal is formed between recess 106, flange 112 of flexible tube 92 resting within recess 106, and the back side of face plate 122 pressing against flange 112. This pressure seal prevents the escape of pressured fluid 84 through the joint between face plate 122 and tubular housing 90. With tubular grate member 94 inserted into the interior of flexible tube 92 as shown in FIG. 6 and 7, end 115 of tubular grate member 94 tightly presses the end of flexible tube 92 against the interior walling of housing 90 to form a pressure seal. This seal is in-part possible due to smooth area 128 of tubular grate member 94. Area 128 presses the end of flexible tube 92 tightly against the interior wall of housing 90. In a normal or relaxed state, flexible tube 92 rests against tubular grate member 94.

An installation and operational description of the valve 10 and pulsation dampener 12 will now be given. When initially installing the invention, the assembled valve 10 should first be installed in pipe 14 utilizing what ever piping or plumbing methods necessary. Pressured fluid 84 should not be within pipe 14, which will require the shutting off of valves or pressure pumps as needed. Valve housing 90 should be positioned within pipe 14 so the direction of fluid 84 through valve 10 will be through first end 98 as may be ascertained from FIG. 6 and 7. Ports 110 and 126 should be positioned upward with lower end of pipe 78 connected to valve 10, and with the upper end of pipe 78 not yet attached to pulsation dampener 12. Pipe 80 should not yet be connected to valve 10 or pulsation dampener 12. Once valve 10 is in place in pipe 14 with pipe 78 aimed upward, a noncompressible liquid 86 should be poured into pipe 78 to completely fill pipe 78 and that portion of cavity 103 surrounding the exterior of flexible tube 92. When selecting a suitable liquid 86, one should select a fluid which will not attack the materials with which the liquid comes in contact, and further one which will not freeze, and one which expands very little on moderate temperature rise, and one should consider the safety of workers and the environment. Some examples of liquids 86 which may be used are water, where freezing does not occur; radiator type anti-freeze solutions; or power steering or brake fluid. Power steering fluid will normally be quite suitable under most conditions for use as liquid 86.

Once pipe 78 and cavity 103 are completely filled with liquid 86, the assembled pulsation dampener 12 should be inverted, and chamber 38 be completely filled through opening 76 with the same liquid 86, being careful to remove all air pockets. When initially filling chamber 38 with liquid 86, compression spring 62 should be applying only very slight if any pressure to diaphragm 34. The next step is to quickly invert pulsation dampener 12 and screw the upper end of pipe 78 by way of rotating dampener 12 into threaded opening 76 without loosing any liquid 86. I have found this can easily be accomplished by forming a temporary plug made of heavy grease, such as wheel bearing grease within opening 76 just prior to the inverting and attachment of pulsation dampener 12 to pipe 78. The grease plug will quickly dissolve in power steering fluid. The main point here is to prevent the escape of liquid 86 which will result in the lost liquid 86 being replaced with air, a compressible material which will reduce the effectiveness of the invention. The process of using a grease plug and quickly inverting pulsation dampener 12 in order to prevent the escape of liquid 86 can actually be accomplished quite easily, and eliminates the need and cost for installing some type of air bleeder structure to bleed air from within chamber 38 if done correctly. FIG. 6 and 7 illustrate liquid 86 within cavity 103 and the lower end of pipe 78.

Once liquid 86 is installed and pulsation dampener 12 is attached to pipe 78 and valve 10, one may next fully connect pipe 80, pipe nipple 81 and valve 88 using any necessary piping or plumbing methods desired. With pipe 80 properly connected and valve 88 open, an open conduit leads from chamber 36 of pulsation dampener 12 into open end 116 of tubular grate member 94 which is in communication with pipe 14 B. Pipe 14 A is in communication tubular grate member 94 from open end 115 thereof as may be ascertained from FIG. 6 and 7.

Referring primarily to FIG. 6. At this point a valve may be opened to allow the flow of fluid 84 into pipe 14 B from main line 15. Assuming pipe 14 B is pressured from another source such as additional gas wells and pressuring pumps 31 pressuring main line 15, which is typically the case as illustrated in FIG. 8, and is maintained at all times at an operating pressure of 800 P.S.I., a portion of valve 10 will be exposed to 800 P.S.I. by way of open end 116, and chamber 36 in pulsation dampener 12 will also be exposed to 800 P.S.I. by way of the open conduit provided by pipe 80 and the associated fittings attached thereto. Further assuming for the moment that pipe 14 A has not yet been pressurized, and that no appreciable additional pressure is being applied to liquid 86 by way of compression spring 62, and thus no appreciable additional pressure is being applied to flexible tube 92. 800 P.S.I. within chamber 36 will press against diaphragm 34 which in turn will press against liquid 86 which in turn will press against the entire exterior surface of flexible tube 92. Since a little less than one-half of the interior surface of flexible tube 92 is exposed to 800 P.S.I. through opening 116 and openings 118 adjacent face plate 122 in tubular grate member 94, essentially this portion of flexible tube 92 will be unaffected due to the lack of a pressure differential. However, the rearward portion of flexible tube 92, that is that portion thereof which is between smooth band 121, solid wall 120 and end 115 of tubular grate member 94 will in effect have no pressure pressing on the interior surface, and 800 P.S.I. on the exterior surface due to the applied pressure of liquid 86 thereon. This exterior pressure on the rearward end of flexible tube 92 will tightly press that portion of the tube 92 against smooth band 121 with equal pressure with which the fluid 84 is attempting to lift flexible tube 92 in order to slip between the interior surface of tube 92 and the stationary band 121 in order to move from pipe 14 B into pipe 14 A. In theory and in reality, fluid 84 will be checked from flowing due to solid wall 120, and flexible tube 92 pressing tightly against smooth band 121 with pressure equal to the pressure with which fluid 84 is attempting to squeeze between flexible tube 92 and smooth band 121. One can easily ascertain that by rotating bolt 50 clockwise to apply additional pressure to liquid 86 in chamber 103, the flow checking would be even more positive in FIG. 6 by providing 810 P.S.I. for example against flexible tube 92 to press it more tightly against smooth band 121.

Figure 5:
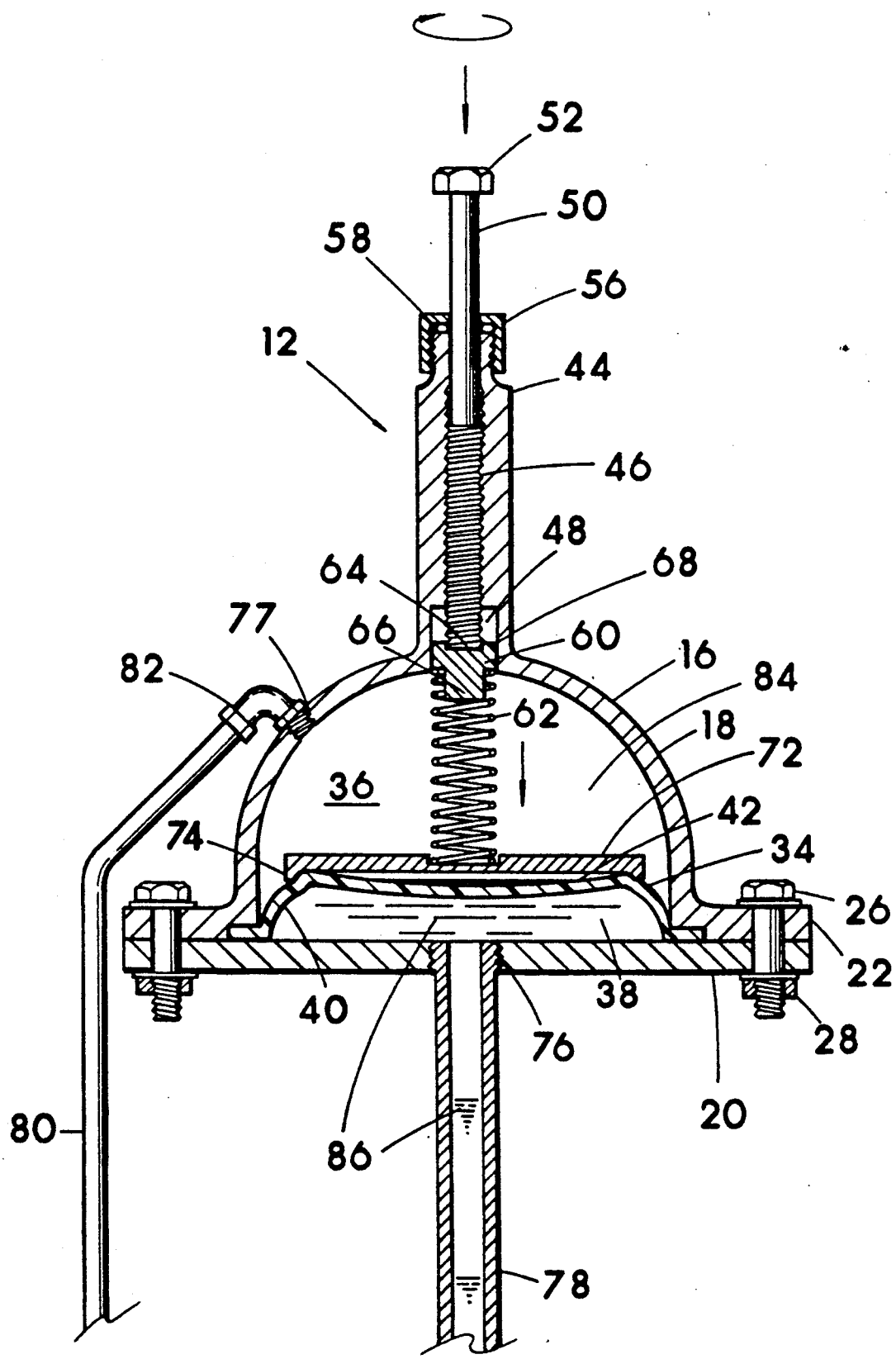
FIG. 5 illustrates the components shown in FIG. 2 and 3 assembled in a cross-sectional view to depict internal operational activities.

Referring now primarily to FIG. 5 and 7. Once pressure from main line 15 has been applied to chamber 36 by way of pipe 80, the pump which feeds pipe 14 A may be started to bring pressure in pipe 14 A to a nominal operating pressure of 820 P.S.I., which will pulse in pressure due to the pump, as may be ascertained from gage 130 in pipe 14 A in FIG. 7 where the gage needle is illustrated in dotted lines in its extreme movements. 820 P.S.I. is just an example assuming main line 15 and pipe 14 B are pressurized to a nominal 800 P.S.I. In any case, it is necessary to have a greater pressure in pipe 14 A than in pipe 14 B and main line 15 in order to induce flow from gas well and pump 31 into main line 15. Assuming little or no additional pressure is being applied to liquid 86 by way of pressure from compression spring 62 above that which is being applied by gas pressure through pipe 80 pressing against diaphragm 34, fluid 84 will be flowing through valve 10 from gas well and pump 31 into pipe 14 B and eventually into main line 15. Fluid 84 will enter tubular grate member 94 through end 115, pass through openings 118, lifting the center of flexible tube 92 and passing over the surface of smooth surface 121, and then enter tubular grate member 94 through openings 118 on the other side of solid wall 120 before leaving valve 10 through end 116 and enter pipe 14 B on a path first through meter 13 and then into main pipe 15. As may be ascertained from pressure gage 130 in pipe 14 B in FIG. 7, the pulsations in fluid 84 from the well pump will carry through valve 10 causing pulsations in pipe 14 B when bolt 50 and spring 62 are not properly adjusted.

In order to initially set bolt 50 and spring 62 to eliminate or greatly reduce the pulsations in fluid 84 being transferred from pipe 14 A to pipe 14 B, and ultimately to the recording meter 13, bolt 50 must be rotated to apply increased pressure to spring 62, diaphragm 34, liquid 86, and ultimately to the exterior surface of flexible tube 92 within chamber 103 of valve 10. During this adjustment process, the gage 130 in pipe 14 B should be carefully watched. As increased pressure is applied to liquid 86, increased pressure will be applied to the exterior of flexible tube 92, moving tube 92 closer toward smooth band 121. The volume of fluid 84 flowing through valve 10 will be decreasing slightly, but more importantly, the needle on gage of pipe 14 B will be reduced in movement, becoming increasingly steady as the result of a reduction in the extreme pressure swings allowed to pass through valve 10. The rotating of bolt 50 should be stopped at the moment the needle of cage 130 of pipe 14 B stops bouncing as indicated by a solid line needle in FIG. 7. This is to ensure maximum volume passing through valve 10 for the highest possible efficiency in the system. Continued rotating of bolt 50 would needlessly reduce the volume of flow through valve 10. Spring 62 will function as a dampener to absorb some of the wild swings in pressure caused by the pump of gas well and pump 31, and any minor pressure changes in pipe 14 B will be reflected in the pressure applied to liquid 86 in chamber 103 thereby instantaneously effecting the pressure differentials between the interior and exterior surfaces of flexible tube 92 and the position of flexible tube 92 relative to smooth band 121 of grate member 94. The combination of spring 62 functioning somewhat as a shock absorber, allowing top surface 42 of diaphragm 34 and pressure distribution plate 72 to move upward and downward within housing 16, and a pressure change in pipe 14 B equating to an immediate pressure change in chamber 103 has been found to very effectively reduce pulsations in pipe 14 B and fluid 84 prior to reaching meter 13.

The reasoning for valve 88 in-line with pipe 80 is simply to be able to close the path between a pressured pipe 14 B and pulsation dampener 12, so as to be able to detach housing section 18 from housing section 20 for servicing the parts within housing 16 when needed, or to completely remove pulsation dampener 12 temporarily for servicing while still pumping fluid 84 through valve 10. Of course the opening of housing 16 or the removal of pulsation dampener 12 should only be accomplished with higher pressure in pipe 14 A when there is still pressure in pipe 14 B, since the check valve function has been temporarily defeated. The above is possible due to the reduced opening of port 110 into chamber 103 and the size and shape of the interior walling of valve 10 around flexible tube 92 which prevents tube 92 from being expanded to a point of rupturing due to a lack of pressure thereon from liquid 86. Valve 88 is optional, but highly recommended.

It should be noted that although valve 10 is shown and described with threads for the attachment of pipes 14 A and 14 B, this is but one possible known method in which a valve could be attached in-line with a pipe. For instance, instead of using threads, apertured flanges could be attached on the ends of pipes 14 A and 14 B which could be bolted to flanges affixed on each end of valve 10, and valve 10 manufactured without the threads to receive a threaded pipe 14. Gaskets or seals should of course be used between the bolt together flanges. Bolt together flanges are well known to plumbers and pipe fitters. It is also anticipated pulsation dampener 12 and valve 10 could be structured within the scope of the invention to at least appear as a single unit as opposed to that which is shown in FIG. 1 which appears to have an upper portion attached to a lower portion by two pipes. This would be accomplished by greatly shortening conduits or pipes 78 and 80 and forming them into a single housing structure which in effect contained the same or similar component parts as pulsation dampener 12 and valve 10.

Although I have very specifically described preferred structures of the invention, it should be understood that the specific details are just that, "preferred" structures given for example to those skilled in the art. Specific structures described may obviously be made without departing from the scope of the invention, and therefore it should be understood that the scope of the invention is not to be limited by the specification and drawings given for example, but is to be determined by the spirit and scope of the appended claims.

What I claim as my invention is:

1. In combination, a pulsation dampener and directional flow check apparatus for connection in-line with a fluid directing conduit, comprising;

a valve having two ends each having means for connecting said valve in-line with a conduit, said valve having means for providing a flow path for a fluid through one said end and out the other said end of said valve, said flow path including an area whereat all of the fluid passing through said valve must pass between a stationary surface and an interior surface of an elastic member, a liquid filled area within said valve and isolated from said flow path, said liquid filled area in communication with an exterior surface of said elastic member, a first conduit means in open communication with said liquid filled area, said first conduit means filled with a liquid which is in communication with the liquid of said liquid filled area, a pressure vessel having a flexible diaphragm affixed therein, said flexible diaphragm dividing an interior cavity of said pressure vessel into a first chamber and a second chamber, said first conduit means connected in open communication with said first chamber, said first chamber filled with liquid which is in communication with the liquid of said first conduit means, a second conduit means in open communication with said second chamber of said pressure vessel, said second conduit means further in open communication with a downstream side of said flow path through said valve, said pressure vessel further including a compression spring biasing means positioned at least in part within said second chamber, said compression spring biasing means providing pressure against said flexible diaphragm, said pressure provided by said compression spring biasing means pressing said diaphragm toward said first chamber of said pressure vessel, means providing for selective adjustment of said pressure applied to said flexible diaphragm by said compression spring biasing means.

2. A combination according to claim 1 wherein said first conduit means is a pipe.

3. A combination according to claim 2 wherein said second conduit means is at least one pipe.

4. A combination according to claim 3 wherein said means providing for selective adjustment of said pressure applied to said flexible diaphragm by said compression spring biasing means includes a threaded bolt threadably engaged within a bore in said pressure vessel, said bolt having an exposed portion to allow manual rotation of said bolt, said bolt further having means for applying pressure to said compression spring biasing means, with said pressure being selectable by manually rotating said bolt.

5. A combination according to claim 4 wherein said pressure vessel includes an upper generally domed portion removably bolted to a generally flat lower plate.

6. In combination, a pulsation dampener and directional flow check apparatus for connection in-line with a fluid directing conduit, comprising;
- a valve having two ends each having means for connecting said valve in-line with a conduit,
- said valve having means for providing a flow path for a fluid through one said end and out the other said end of said valve, said flow path including an area whereat all of the fluid passing through said valve must pass between a stationary surface and an interior surface of an elastic member,
- a liquid filled area within said valve and isolated from said flow path, said liquid filled area in communication with an exterior surface of said elastic member,
- a pressure vessel having a flexible diaphragm affixed therein, said flexible diaphragm dividing an interior cavity of said pressure vessel into a first chamber and a second chamber,
- said first chamber filled with a liquid in communication with said liquid filled area of said valve,
- a downstream side of said flow path in communication with said second chamber,
- said pressure vessel further including a compression spring biasing means positioned at least in part within said second chamber, said compression spring biasing means providing pressure against said flexible diaphragm, said pressure provided by said compression spring biasing means pressing said diaphragm toward said first chamber of said pressure vessel,
- means providing for selective adjustment of said pressure applied to said flexible diaphragm by said compression spring biasing means.

* * * * *